June 5, 1928.  L. E. CHASSEVENT  1,672,638
METHOD AND MEANS FOR THE PREPARATION OF PLASTER PRIOR TO USING
Filed Feb. 5, 1927
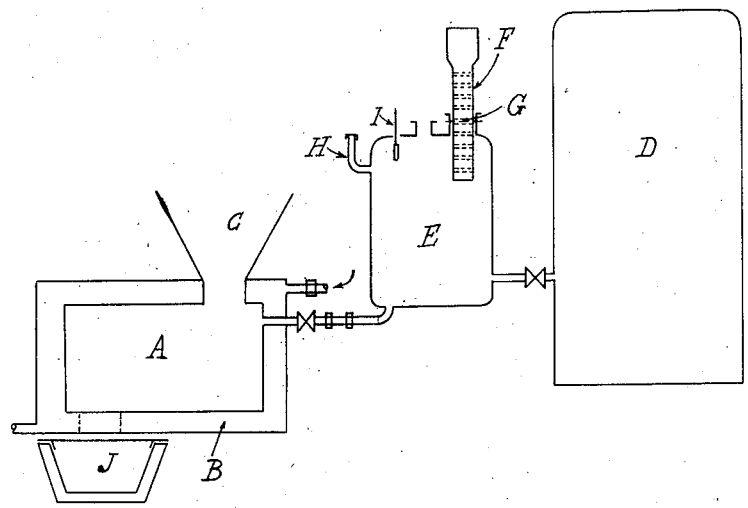
INVENTOR:
Louis Emile Chassevent
BY: Ruep, Bayu & Bakelar
ATTORNEYS.

Patented June 5, 1928.

1,672,638

UNITED STATES PATENT OFFICE.

LOUIS EMILE CHASSEVENT, OF PARIS, FRANCE.

METHOD AND MEANS FOR THE PREPARATION OF PLASTER PRIOR TO USING.

Application filed February 5, 1927, Serial No. 166,262, and in France February 20, 1926.

The present invention relates to improved methods and means for the preparation of a paste of plaster of Paris prior to using.

The fastness with which the plaster of Paris (which will be hereinafter more briefly designated by "plaster") hardens when mixed with water under ordinary conditions causes its use to be somewhat delicate and does not allow its preparation by mechanical means and in great quantity to preserve it until used and then delivered in proportion to the requirements. Besides, owing to the harmful influence which hardened plaster, even in small quantities, has on the plaster under preparation, a careful cleaning of the containers and tools prior to said preparation is now indispensable. Further, adding an excess of water when mixing as well as using the plaster when the setting or hardening of the same has already begun result later on in a considerable reduction of the mechanical resistance of the said plaster.

The present invention has for its objects a method which permits, without addition of any other material, to prepare and preserve said plaster for many hours before using it, and a standard apparatus by means of which the invention may be easily put into practice.

According to the improved method, the plaster is heated by a water containing material at a temperature comprised between 60° C. and 100° C., the temperature of the mass being then prevented from falling below 60° C. When mixed with water, the plaster is kept either in containers the walls of which have a low heat conductibility, or in containers with double walls between which a fluid (for instance water, in liquid or in vapor form) at a temperature of from 60° C. to 100° C. is caused to circulate. In the latter case, the resulting paste may be maintained in the fluid state during many hours (5 and 6 hours and more when evaporation in the open air is prevented). The plaster mixed and preserved in the manner described is not subject to any alteration or damage. The paste, which is used at a temperature above 50° C. begins slowly to become thicker at about 50° C. and rapidly hardens due to cooling when its temperature falls to about from 38° C. to 45° C. according to the fluidity and the chemical composition of the paste employed.

For instance, a plaster, which has been mixed according to the manner outlined above and in the proportion of 100 grammes for 40 grammes of water, hardens rapidly at 43°; a plaster, which has been mixed in the proportion of 100 grammes for 55 grammes of water, hardens rapidly at 38°.

The products usually added to the plaster to delay hardening result generally in reducing the speed of hardening. In contradistinction, the plaster prepared according to the present method hardens rapidly as soon as the hardening has begun, this facilitating the unmolding. The resistance values of that plaster, when tested after 24 hours as well as after 7 days, are not inferior to those obtained with a plaster which has been mixed under the best conditions of the usual method.

The plaster, so maintained at a temperature above 60° C., may be preserved in containers and caused to circulate through conduits in contact with an important quantity either of liquid water steam, atomized water or wet materials, without any danger of having the plaster setting within the apparatus, containers or conduits or at the outlets thereof. Thus the present improved method allows the use of the apparatus commonly employed in the projection of cement to the mechanical application or projection of plaster. The plaster prepared according to the present method may be applied or projected either under the state of a hot paste or as a powder with atomized water and in no case there will be danger of having some plaster setting in the apparatus and closing the conduits and the outlets thereof.

The present method permits also to avoid the setting of the plaster in the apparatus utilized in the fabrication of agglomerates, tiles, pantiles, bricks, etc.; the foreign materials which are often added to the plaster do not more need to be desiccated—owing to the application of the new method—before being mixed with the plaster even if the latter is of the fast hardening quality. Thus the present invention permits to obtain rapidly and in great quantity a very homogeneous mixture of water and plaster and foreign materials, while avoiding to have the plaster setting in the apparatus and losing its qualities there. The mixture prepared above 60° C. according to the present method sets rapidly by cooling down when coming out of the apparatus.

The appended drawing shows by way of example a diagrammatic view of an apparatus by means of which the present invention may be applied to the mechanical mixing of plaster in great quantity.

This apparatus comprises essentially a malaxing device of any preferred type but provided with double walls; a temperature comprised between 60° C. and 100° C. is maintained in the interval provided between said walls by a circulation of a fluid heated by any preferred means. The plaster, which enters said malaxing device through a loading hopper C, is mixed with water at a temperature comprised between 60° C. and 100° C. Said water, which is heated by a boiler D may be measured in a recipient E which permits to automatically regulate the quantity of mixing water for a given weight of plaster.

To that purpose, said recipient E comprises a plunging piston F the stroke of which may be adjusted by a pin G and a level tube H. The temperature is observed by means of a thermometer I.

The plaster which is mixed in A may be collected in a recipient J provided with double walls between which is maintained a temperature comprised between 60° C. and 100° C. by a circulation of water or steam. Said recipient J may also be separately employed for the mixing by hand. Water at a temperature above 60° C. is added to the plaster in said recipient. Said plaster may be then kept in said recipient until it is used. Heating directly the mass by steam reduces the cooling of the upper layer of the mixture.

When it is possible to utilize all the plaster somewhat rapidly (within half an hour for instance) after the mixing operation, the heating of the paste containing recipient may be avoided by operating as follows: The plaster is mixed with water at a temperature comprised between 90° C. and 100° C. within a recipient the walls of which have a low heat conductibility in order to avoid external cooling. The plaster mixed under said conditions must be employed before its temperature reaches 50° C. since the mass sets at approximately the latter temperature.

The application of said method allows the mechanical mixing of many hundred bags of plaster per day under the supervision of a single operator and to supply building works with a plaster which is regularly mixed and easy to use. The plaster mixed according to the new method is not altered or damaged by the contact of small quantities of plaster already hardened so long as its temperature remains above 60° C. That property enables to considerably reduce the cleaning—which must now be very carefully made—of the tools and recipients devoted to using or carrying said plaster.

Owing to the separate use of heated double wall receipients J, it is further possible to preserve a small quantity of plaster for many hours after mixing.

When using the plaster as a paste, it is simply necessary to mix said plaster with the hot fluid only once, the preservability of the obtained paste enabling the execution of works requiring for their completion a long time, a particular care, but a very small quantity of material such as tile fixing, fastening of building elements, moulding, statue making, etc. The plaster paste which is so preserved possesses the advantage of keeping the same fluidity during the whole duration of its being used.

Obviously, the invention is not limited to any particular embodiment of the general principles of the apparatus, since the constructural forms above described and diagrammatically shown have only been selected by way of example. In particular, the malaxing device may be directly heated by a steam jet supplied from the boiler D and injected within the apparatus.

Having now described my invention, what I claim as new and desire to secure by Letters Patent is:

1. A method for the preparation of a paste of plaster of Paris which consists in mixing the plaster with water, the mass having a temperature at least equal to 60° C., and preventing said temperature from lowering below 60° C. prior to use.

2. A method for the preparation of a paste of plaster of Paris which consists in mixing the plaster with water, the mass having a temperature between 60° C. and 100° C. and preventing said temperature from lowering below 60° C. prior to use.

3. A method for the preparation of a paste of plaster of Paris which consists in mixing the plaster with wet materials, the mass having a temperature between 60° and 100° C. and preventing said temperature from lowering below 60° C. prior to use.

4. A method for the preparation of a paste of plaster of Paris which consists in mixing the plaster with water, the plaster and water having such a temperature as to bring the mass to a temperature between 60° C. and 100° C. and preventing said temperature from lowering below 60° C. prior to use.

5. A method for the preparation of a paste of plaster of Paris which consists in mixing the plaster with water having a temperature between 60° C. and 100° C. and preventing said temperature from lowering below 60° C. prior to use.

6. A method for the preparation of a paste of plaster of Paris which consists in mixing the plaster with water and steam, so as to bring the mass to a temperature between 60° C. and 100° C., and preventing said temperature from lowering below 60° prior to use.

7. A method for the preparation of a paste of plaster of Paris which consists in mixing the plaster with water, the mass having a temperature between 60° C. and 100° C. and retarding the natural cooling.

8. A method for the preparation of a paste of plaster of Paris which consists in mixing the plaster with water, the mass having a temperature between 60° C. and 100° C. and heating the mass for preventing the natural cooling below 60° C.

9. A method for the preparation of a paste of plaster of Paris which consists in mixing the plaster with water, the mass having a temperature between 60° C. and 100° C. and heating the mass, by means of a hot fluid, for preventing the natural cooling below 60° C.

10. A method for the preparation of a paste of plaster of Paris which consists in mixing the plaster with water, the mass having a temperature between 60° C. and 100° C. and heating the mass, by contact with a hot fluid, for preventing the natural cooling below 60° C.

11. A method for the preparation of a paste of plaster of Paris which consists in mixing the plaster with water, the mass having a temperature between 60° C. and 100° C. and heating the mass, by means of steam, for preventing the natural cooling below 60° C.

12. A method for the preparation of a paste of plaster of Paris which consists in mixing the plaster with water, the mass having a temperature between 60° C. and 100° C. and heating the mass, by means of a circulation of a hot fluid, for preventing the natural cooling below 60° C.

13. In a plant for the preparation of a paste of plaster of Paris, means adapted to contain the paste of plaster and means for keeping said paste at a predetermined temperature.

14. In a plant for the preparation of a paste of plaster of Paris, means adapted to contain the paste of plaster, and means for heating the paste.

15. In a plant for the preparation of a paste of plaster of Paris, heat insulated containers for the paste of plaster.

16. In a plant for the preparation of a paste of plaster of Paris, heated containers and heat insulated containers for the paste of plaster.

17. In a plant for the preparation of a paste of plaster of Paris, a container for the paste of plaster having insulating double walls.

18. In a plant for the preparation of a paste of plaster of Paris, a container for the paste of plaster having insulating double walls and means for circulating a hot fluid between said walls.

19. In a plant for the preparation of a paste of plaster of Paris, a heat-insulated container for the paste of plaster, a boiler for heating water and means for delivering hot water from said boiler to said container.

In testimony whereof I have signed my name to this specification.

LOUIS EMILE CHASSEVENT.